(12) United States Patent
Bae

(10) Patent No.: US 7,993,270 B2
(45) Date of Patent: Aug. 9, 2011

(54) DIGITAL RECEIVE-FOCUSING APPARATUS USING ANALOGUE MULTIPLEXERS

(75) Inventor: Moo Ho Bae, Seoul (KR)

(73) Assignee: Medison Co., Ltd., Kangwon-do (KR)

( * ) Notice: Subject to any disclaimer, the term of this patent is extended or adjusted under 35 U.S.C. 154(b) by 2485 days.

(21) Appl. No.: 10/619,613

(22) Filed: Jul. 16, 2003

(65) Prior Publication Data

US 2004/0019277 A1  Jan. 29, 2004

(30) Foreign Application Priority Data

Jul. 23, 2002 (KR) .................. 10-2002-0043133

(51) Int. Cl.
*A61B 8/00* (2006.01)
(52) U.S. Cl. ........................ 600/437; 600/447
(58) Field of Classification Search .................. 600/437, 600/440–447, 459, 463; 73/602, 625–626, 73/628; 367/7, 103–105, 121–123; 128/916; 310/318, 319
See application file for complete search history.

(56) References Cited

U.S. PATENT DOCUMENTS

| | | | | |
|---|---|---|---|---|
| 4,325,257 A * | 4/1982 | Kino et al. ...................... 73/626 |
| 4,576,045 A * | 3/1986 | Miller-Jones .................. 73/626 |
| 4,759,372 A * | 7/1988 | Umemura et al. ............ 600/447 |
| 4,974,211 A * | 11/1990 | Corl ................................. 367/7 |
| 5,226,847 A * | 7/1993 | Thomas et al. ................ 600/463 |
| 5,268,877 A * | 12/1993 | Odell ............................ 367/103 |
| 5,276,654 A * | 1/1994 | Mallart et al. .................... 367/7 |
| 5,345,426 A * | 9/1994 | Lipschutz ..................... 367/103 |
| 5,520,186 A * | 5/1996 | Deitrich ......................... 600/437 |
| 5,590,659 A * | 1/1997 | Hamilton et al. ............. 600/447 |
| 5,617,862 A * | 4/1997 | Cole et al. ..................... 600/459 |
| 5,905,692 A * | 5/1999 | Dolazza et al. ............... 367/123 |
| 5,935,072 A * | 8/1999 | Hamilton et al. ............. 600/447 |
| 5,947,905 A * | 9/1999 | Hadjicostis et al. .......... 600/463 |
| 5,964,709 A * | 10/1999 | Chiang et al. ................. 600/447 |
| 5,967,984 A * | 10/1999 | Chu et al. ...................... 600/439 |
| 5,980,458 A * | 11/1999 | Clark ............................ 600/437 |
| 6,138,513 A * | 10/2000 | Barabash et al. .............. 73/602 |
| 6,208,189 B1* | 3/2001 | Freeman et al. .............. 327/277 |
| 6,254,542 B1* | 7/2001 | Hamilton et al. ............. 600/447 |
| 6,271,620 B1* | 8/2001 | Ladabaum .................... 310/334 |
| 6,494,842 B2* | 12/2002 | Bae ................................ 600/447 |
| 6,508,764 B1* | 1/2003 | Thiele et al. .................. 600/437 |
| 6,540,677 B1* | 4/2003 | Angelsen et al. ............. 600/437 |
| 6,695,783 B2* | 2/2004 | Henderson et al. ........... 600/443 |
| 6,801,148 B2* | 10/2004 | Freeman et al. .............. 341/143 |

(Continued)

FOREIGN PATENT DOCUMENTS

| | | |
|---|---|---|
| JP | 6-114061 | 4/1994 |
| JP | 8-56944 | 3/1996 |
| KR | 2002-0060573 | 7/2002 |

*Primary Examiner* — Francis Jaworski
(74) *Attorney, Agent, or Firm* — Oblon, Spivak, McClelland, Maier & Neustadt, L.L.P.

(57) ABSTRACT

A digital receive-focusing apparatus for receive-focusing ultrasound channel signals from a plurality of transducers in an ultrasound imaging system is provided. The digital receive-focusing apparatus in accordance with the present invention comprises a plurality of channel modules responsive to the ultrasound channel signals for producing a receive-focused beam. Each of the plurality of channel modules comprises an analogue multiplexer for multiplexing at least two ultrasound channel signals and a signal processor for digitally processing and compensating the multiplexed signal.

1 Claim, 1 Drawing Sheet

U.S. PATENT DOCUMENTS

| | | | |
|---|---|---|---|
| 6,967,975 B2 * | 11/2005 | Van Stalen et al. | 370/535 |
| 7,508,737 B1 * | 3/2009 | Alexandru | 367/103 |
| 2002/0139193 A1 * | 10/2002 | Angelsen et al. | 73/602 |
| 2003/0163046 A1 * | 8/2003 | Nohara et al. | 600/443 |
| 2004/0147841 A1 * | 7/2004 | McLaughlin et al. | 600/437 |
| 2005/0203396 A1 * | 9/2005 | Angelsen et al. | 600/437 |

* cited by examiner

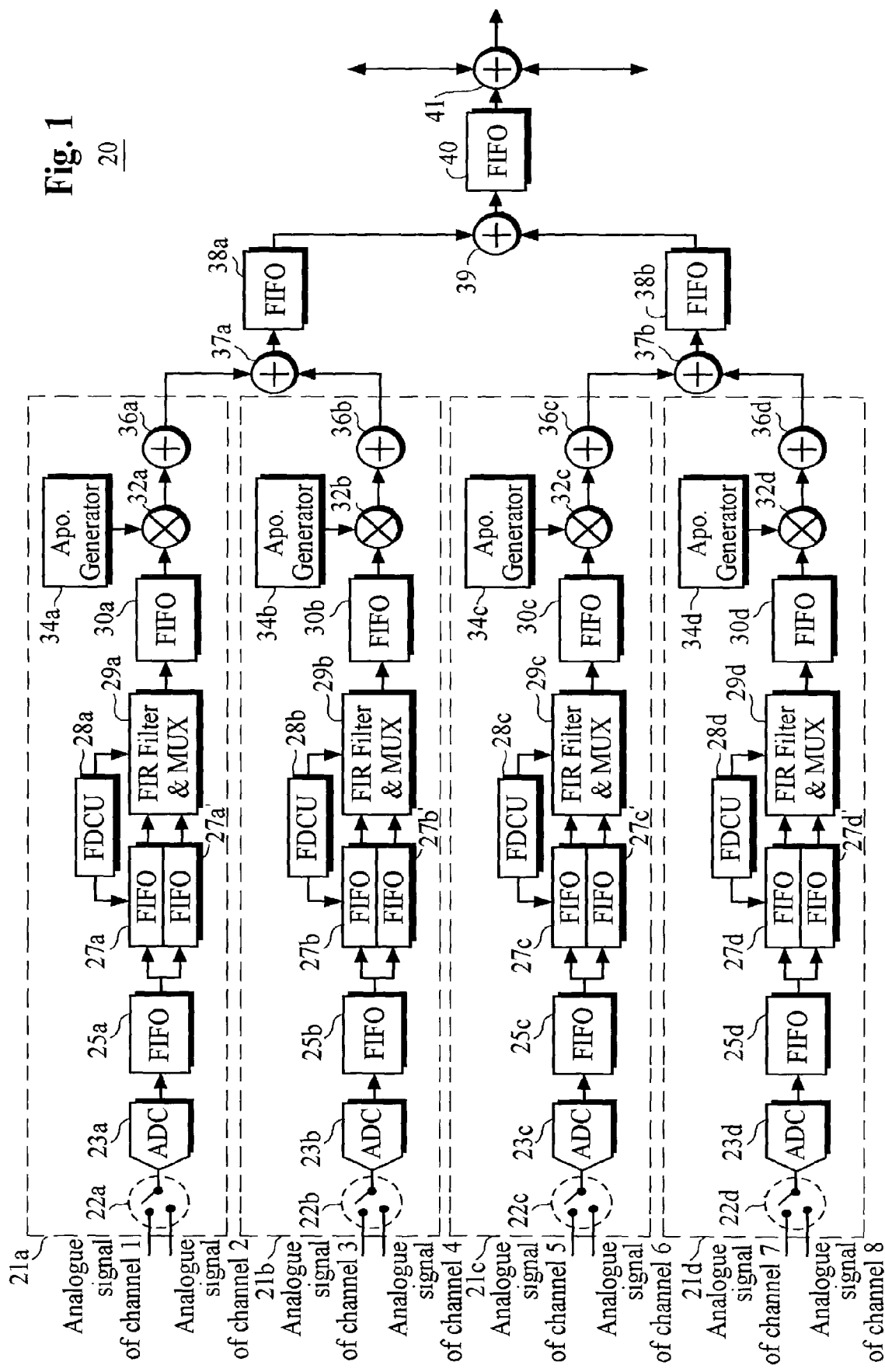

DIGITAL RECEIVE-FOCUSING APPARATUS USING ANALOGUE MULTIPLEXERS

FIELD OF THE INVENTION

The present invention relates to a digital receive-focusing apparatus used in an ultrasound imaging system, and more particularly, to a digital receive-focusing apparatus having a simple hardware configuration capable of processing a multiplicity of channel signals.

BACKGROUND OF THE INVENTION

The ultrasound imaging system has been widely used to acquire an image showing an internal organ of a human body for medical diagnosis purposes. The ultrasound imaging system basically incorporates several functional components to perform ultrasound signal transmission and reception, and various subsequent signal processing. For example, transducers are used to transmit ultrasound signals to an internal organ of the human body and to detect echo signals reflected from the body. An ultrasound receive-focusing apparatus is used to receive-focus the reflected echo signals, i.e., to add appropriate time delays to the echo signals and synthesize the delayed echo signals so that output beams are formed.

Among these components, the receive-focusing apparatus is known to be the component that most affects the performance of the ultrasound imaging system. That is, the performance of the ultrasound imaging system depends largely upon that of the receive-focusing apparatus. The size of the hardware for implementing receive-focusing takes up a significant portion of the entire hardware of the system because the receive-focusing apparatus needs to incorporate the same number of channel modules as transducers, each module including an analog-to digital converter, a delay element, a memory element and an apodization element.

Two types of receive-focusing apparatus are known in the art: analogue and digital. Recently, the digital receive-focusing apparatus is being more widely used than the analogue receive-focusing apparatus because it excels over the latter in controlling time delays and performing fine beam focusing, due to the recent developments in digital circuit technology.

Generally, the digital receive-focusing apparatus needs to process ultrasound signals originating from a large number of channels, for example, 32-512 channels to satisfy the resolution requirements for ultrasound imaging systems. As larger numbers of channels are implemented to satisfy higher resolution requirements, a digital receive-focusing apparatus capable of processing even more channel signals is necessary. In order to process a larger number of channel signals, a corresponding number of channel modules must be included in the receive-focusing apparatus, which means that the complexity of the digital receive-focusing apparatus increases.

SUMMARY OF THE INVENTION

Accordingly, an object of the present invention is to provide an improved digital receive-focusing apparatus that can efficiently process a multiplicity of channel signals with minimum hardware by using analogue multiplexers.

In accordance with an aspect of the present invention, there is provided a digital receive-focusing apparatus for use in an ultrasound imaging system, comprising: a plurality of channel modules responsive to ultrasound channel signals for producing a receive-focused beam, each of said plurality of channel modules comprising: i) means for multiplexing ultrasound signals originating from at least two ultrasound channels; and ii) means for digitally processing and compensating said multiplexed signal.

BRIEF DESCRIPTION OF THE DRAWING

The above and other objects and features of the present invention will become apparent from the following description of the embodiment given in conjunction with the accompanying drawing:

FIG. 1 shows a hardware block diagram of a digital receive-focusing apparatus in accordance with an embodiment of the present invention.

DETAILED DESCRIPTION OF THE PRESENT INVENTION

Referring to FIG. 1, digital receive-focusing apparatus 20 has four channel modules 21a-21d. Each channel module processes a plurality of ultrasound signals from a plurality of channels, for example, two channels to form a receive-focused beam. Thus, receive-focusing apparatus 20 is capable of processing ultrasound signals from a total of eight channels. Since channel modules 21a-21d consist of identical elements to each other as shown in FIG. 1, only one exemplary channel module, i.e., channel module 21a will be discussed in the following descriptions.

The two ultrasound signals from the first and second channels are inputted to analogue multiplexer 22a. Analogue multiplexer 22a performs a sequential switching operation upon the two ultrasound channel signals, under the control of a system clock (not shown), to multiplex the two ultrasound channel signals and output a multiplexed signal. According to the present invention, the inclusion of the analogue multiplexers at the front end of the digital receive-focusing apparatus allows the entire structure to be simplified. The multiplexed signal is then provided to analogue-to-digital converter (ADC) 23a to convert the same into a digital signal. Although analogue multiplexer 22a has been described and shown herein to multiplex the two ultrasound signals from the two channels, the analogue multiplexer can be designed to multiplex more than two ultrasound signals depending on an allowable amount of delay and the system performance, as will be apparent to those skilled in the art.

The converted digital signal is inputted through buffer (of the FIFO type) 25a to buffers (of the FIFO type) 27a, 27a', which are provided for the purpose of receive-focusing dual beams, to undergo time-delay processing. Although only two buffers 27a, 27a' have been illustrated in this embodiment, those skilled in the art will appreciate that the number of buffers would vary in accordance with a desired multi-beam mode. The timing of inputting the converted digital signals from buffer 25a to buffers 27a, 27a' is controlled by a write pointer (not shown). That is, the dual-beam digital signal is simultaneously inputted to buffers 27a, 27a' from buffer 25a under the control of the write pointer. On the other hand, the reading-out of the digital signals stored in buffers 27a, 27a' is controlled by a read-out pointer (not shown). The read-out pointer controls, on the basis of two different amounts of delay provided by a focusing delay computation unit (FDCU) 28a, each of buffers 27a, 27a' to output the respectively stored data at a different time. Note that the amounts of delay provided to the read-out pointer are pre-calculated by and stored in FDCU 28a based on the rate of switching at analogue multiplexer 22a. The read-out data are then transferred to FIR filter & MUX 29a.

FIR filter & MUX 29a performs filtering and fine-delaying operations upon the dual-beam digital data delayed at buffers 27a, 27a'. More particularly, the dual-beam digital data read out from buffers 27a, 27a' are filtered through multiplication operations by predetermined filter coefficients as provided by a coefficient bank (not shown), and an addition operation. FIR filter & MUX 29a also acts as an interpolator for the digital data from buffers 27a, 27a' in order to meet the sampling frequency requirement as set by digital receive-focusing apparatus 20. FIR filter & MUX 29a compensates the digital data from buffers 27a, 27a' on the basis of amounts of delay provided by FDCU 28a. Assuming that the signal from the first channel has been sampled faster by a predetermined rate than that from the second channel, FIR filter & MUX 29a add a predetermined amount of delay to the digital data from the first channel so that the signal from the first channel is correspondingly delayed in consideration of its faster sampling rate.

Meanwhile, a predetermined amount of delay, which is relatively small compared to that for the first channel, is also added to the digital data from the second channel in order to compensate for the relatively low sampling rate for the second channel. Accordingly, FIR filter & MUX 29a can compensate the digital data from the first and second channels as if the sampling rate for the analogue signals from the first and second channels were the same. The filtered and interpolated data is transferred to buffer (of the FIFO type) 30a.

Buffer 30a coarsely delays the digital data from FIR filter & MUX 29a. The function of buffer 30a is similar to those of buffers 27a, 27a'. The digital data delayed at buffer 30a are provided to multiplier 32a. Multiplier 32a multiplies the digital data from buffer 30a by apodization coefficients provided by apodization generator 34a in order to suppress the side lobe components of the analogue signals from the first and second channels. The multiplied digital data is provided to first adder 36a.

The digital data from the first and second channels, which are added at first adder 36a, are added at second adder 37a to digital data from the third and fourth channels, which are outputted from first adder 36b of second channel module 21b. The digital data outputted from second adder 37a is delayed at buffer (of the FIFO type) 38a. Similarly, digital data from the fifth channel to the eighth channel are added at second adder 37b. The digital data outputted from second adder 37b are delayed at buffer (of the FIFO type) 38b. The digital data from buffers 38a, 38b are added at third adder 39 to form a receive-focused beam. The receive-focused beam is transferred to buffer (of the FIFO type) 40 where the receive-focused beam is delayed again. The delayed data is then added at fourth adder 41 to other receive-focused beams from other channel modules (not shown).

As described above, the digital receive-focusing apparatus of the present invention employs an analogue multiplexer, which alternately samples a plurality of analogue signals from a plurality of channels, at each channel module thereof.

Thus, the digital receive-focusing apparatus of the present invention can operate in a multi-channel multi-beam mode, thereby improving the performance of the ultrasound imaging system. Since the digital receive-focusing apparatus of the present invention is designed to process analogue signals from multiple channels at each channel module, the hardware structure of the entire system can be simplified to a great degree. Further, in case that the digital receive-focusing apparatus is integrated as an Application Specific Integrated Circuit (ASIC), the costs associated with designing and fabricating the ASIC can be minimized, since the number of ADCs, which is otherwise required to be the same as that of channels and which occupy approximately 50% of the entire size of the ASIC, can be reduced by using analogue multiplexers.

Although the embodiment of the present invention has been described as using the analogue multiplexers at the front end of the ADCs at the respective channel modules, Time Gain Compensation (TGC) amplifiers, which operate very fast, may be employed at the front end of the ADCs and the analogue multiplexers coupled to the TGC amplifiers so that the TGC amplifier and the ADC in each channel module handle analogue signals from a plurality of channels.

While the present invention has been shown and described with respect to a particular embodiment, those skilled in the art will recognize many changes and modifications may be made without departing from the spirit and scope of the invention as defined in the appended claims.

What is claimed is:

1. A digital receive-focusing apparatus for use in an ultrasound imaging system comprising:
   a plurality of channel modules responsive to ultrasound channel signals, and configured to produce a receive-focused beam, each of said plurality of channel modules including,
      an analogue multiplexer configured to multiplex ultrasound signals originating from at least two ultrasound channels;
      an analogue-to-digital converter configured to convert said multiplexed ultrasound signals into digital signals;
      a first delay configured to receive said digital signals and to output the digital signals at a different time based on different amounts of delay pre-calculated based on a switching rate at the analogue multiplexer;
      a compensator configured to compensate said digital signal by filtering and time-delaying said digital signal;
      a second delay configured to coarsely delay said compensated digital signals;
      a multiplier configured to multiply said delayed digital signals by apodization coefficients provided by an apodization generator; and
      an adder configured to add said multiplied digital data.

* * * * *